United States Patent
Kamogi et al.

(10) Patent No.: US 10,236,749 B2
(45) Date of Patent: Mar. 19, 2019

(54) MOTOR

(71) Applicant: MINEBEA MITSUMI INC., Kitasaku-gun, Nagano (JP)

(72) Inventors: Yutaka Kamogi, Fukuroi (JP); Yasuhiro Ikehara, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 364 days.

(21) Appl. No.: 15/331,202

(22) Filed: Oct. 21, 2016

(65) Prior Publication Data
US 2017/0117777 A1  Apr. 27, 2017

(30) Foreign Application Priority Data
Oct. 26, 2015  (JP) .................................. 2015-209584

(51) Int. Cl.
*H02K 9/22* (2006.01)
*H02K 11/33* (2016.01)
*H02P 27/06* (2006.01)

(52) U.S. Cl.
CPC .............. *H02K 9/22* (2013.01); *H02K 11/33* (2016.01); *H02P 27/06* (2013.01)

(58) Field of Classification Search
CPC .................................. H02K 9/22; H02K 11/33
See application file for complete search history.

(56) References Cited

U.S. PATENT DOCUMENTS

2007/0145836 A1*  6/2007  Bostwick ................ H02K 3/50
                                                     310/64
2016/0006324 A1*  1/2016  Akutsu ................... H02K 5/15
                                                     310/67 R

FOREIGN PATENT DOCUMENTS

| JP | 2010-028925 A | 2/2010 |
| JP | 2013-115923 A | 6/2013 |
| JP | 2015-089151 A | 5/2015 |

OTHER PUBLICATIONS

Notification for Reasons for Refusal dated Oct. 31, 2017 for corresponding Japanese Application No. 2015-209584 and English translation.

* cited by examiner

*Primary Examiner* — Ramon M Barrera
(74) *Attorney, Agent, or Firm* — Pearne & Gordon LLP (57) ABSTRACT

A motor comprises a motor main body including a rotor and a stator around which a coil is wound, a drive circuit part including a circuit board to which a drive circuit including a power element is attached on mainly one face, a heat sink arranged on another face of the circuit board and to radiate heat of the drive circuit part, and a winding terminal to which at one side of the winding terminal an end portion of the coil of the motor main body is electrically connected. Another side of the winding terminal is partially electrically connected to the power element attached to the circuit board, and the winding terminal conducts heat generated by the power element from the one face to the other face of the circuit board.

7 Claims, 7 Drawing Sheets

MOTOR

CROSS REFERENCE TO RELATED APPLICATIONS

This application claims the benefit of Japanese Patent Application No. 2015-209584, filed on Oct. 26, 2015, which is hereby incorporated by reference in its entirety.

BACKGROUND

Technical Field

The present disclosure relates to a motor.

Background Art

In recent years, quality of a power element has improved so that a large current can be controlled even with a compact power element, thus, a high output has become achievable even with a compact motor. However, heat generated by the power element increases accordingly. Effective heat radiation is therefore desired.

As a measure of heat radiation for a power substrate equipped with a power element to which a large current is applied, Japanese Unexamined Application Publication No. 2015-089151 discloses a method in which a power element mounted on a surface of a power substrate by means of a through hole provided at the power substrate is exposed to a heat sink on the reverse side of the power substrate, and a method in which a number of small through holes (with a diameter of about $\phi$0.2 mm to $\phi$0.8 mm) are provided directly under a power element of a power substrate or on the periphery of the power element and the heat is radiated through the through holes to the heat sink.

However, according to Japanese Unexamined Application Publication No. 2015-089151, with the above methods, it is required to enlarge the diameter of the through holes and to increase the number of the through holes in order to improve the efficiency of heat radiation. Accordingly, the area of the substrate is enlarged and the value of the product is decreased.

Japanese Unexamined Application Publication No. 2015-089151 explains furthermore that there has conventionally been a method of carrying out higher heat radiation of substrate material as a heat-radiating measure of a power substrate. More specifically, it is disclosed that, instead of a resin substrate (glass epoxy substrate) which is widely prevalent, broadly utilizable and low in price, a substrate is made of ceramic or aluminum.

Japanese Unexamined Application Publication No. 2015-089151 teaches however that replacing a substrate with a substrate made of ceramic or aluminum, increases the cost of the substrate (ca. 5 times in the same volume ratio).

The present disclosure is related to providing a motor with improved heat radiation performance while enlargement of a substrate and increase of cost of the substrate are prevented.

SUMMARY

One aspect of the present disclosure is comprehended by the following configurations.
(1) A motor according to the present disclosure comprises a motor main body including a rotor and a stator around which a coil is wound, a drive circuit part including a circuit board to which a drive circuit including a power element is attached on mainly one face, a heat sink arranged on another face of the circuit board and to radiate heat of the drive circuit part, and a winding terminal to which at one side of said winding terminal an end portion of the coil of the motor main body is electrically connected, another side of said winding terminal being partially electrically connected to the power element attached to the circuit board, and said winding terminal to conduct heat generated by the power element from the one face to the other face of the circuit board.
(2) According to the above configuration (1), an electrical isolating and heat conductive material is provided on one face of the heat sink to be on the circuit board side.
(3) According to the above configuration (1) or (2), another side of the winding terminal is soldered to a land of the circuit board electrically connected to the power element.
(4) According the above configuration (3), the land is provided at the other face of the circuit board and the land is electrically connected to the power element with an electrical conductive pattern connected from the land to the one face of the circuit board.
(5) According to one of the configurations (1) to (4), an end portion on the other side of the winding terminal is arranged to project from the other face of the circuit board and arranged in a groove part formed at the heat sink so as not to directly contact the heat sink.
(6) According to the above configuration (5), an electrical isolating and heat conductive material is provided in the groove part of the heat sink to conduct heat from the end portion at the other side of the winding terminal to the heat sink.
(7) According to one of the above configurations (1) to (6), a material with low heat resistance is used for the winding terminal, and a portion of the winding terminal for heat conduction from the one face to the other face of the circuit board has a cross-sectional area that is sufficiently larger than a cross-sectional area required for a current flow.

According to the present disclosure, it is possible to provide a motor with improved heat radiation performance while enlargement of a substrate and increase of a cost of the substrate are prevented.

DETAILED DESCRIPTION

Hereinafter, a mode to carry out the present disclosure (hereinafter referred to as an "embodiment") will be explained in detail based on the attached drawings.

The same elements have an identical reference numeral throughout the explanation of the embodiment.

Figure 1:
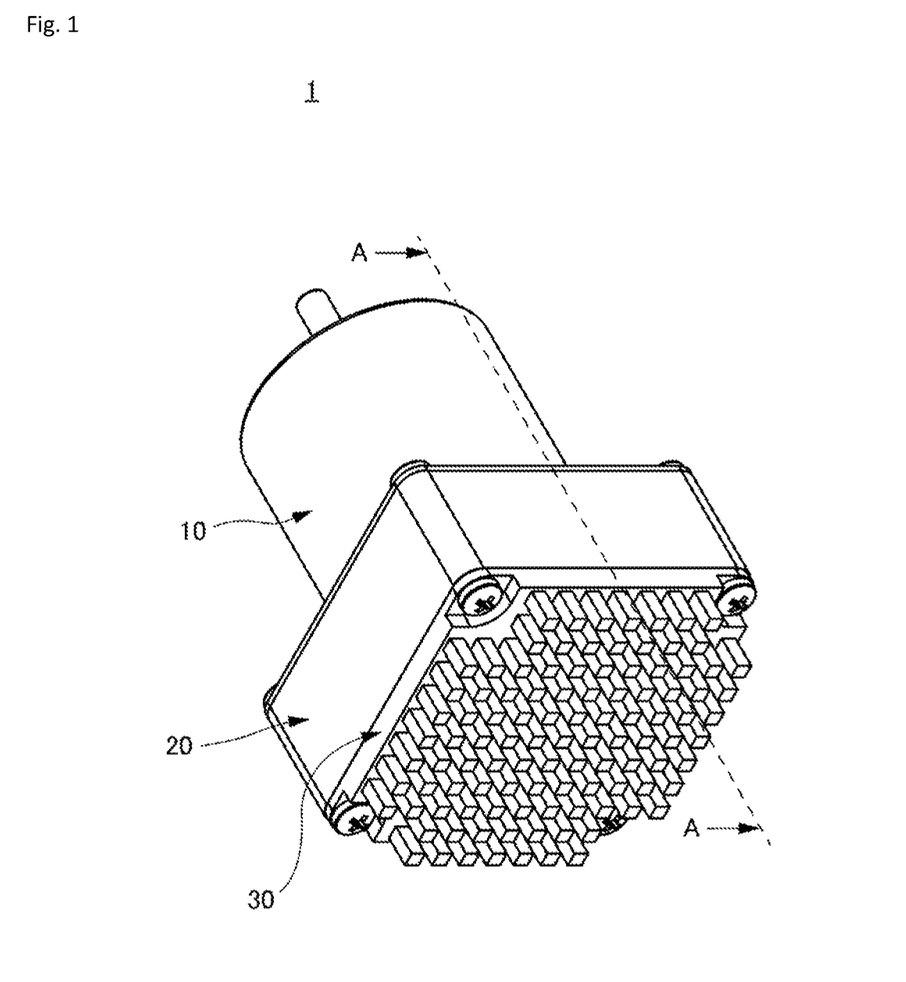
FIG. 1 is a perspective view of a motor according to an embodiment of the present disclosure.
Figure 2:
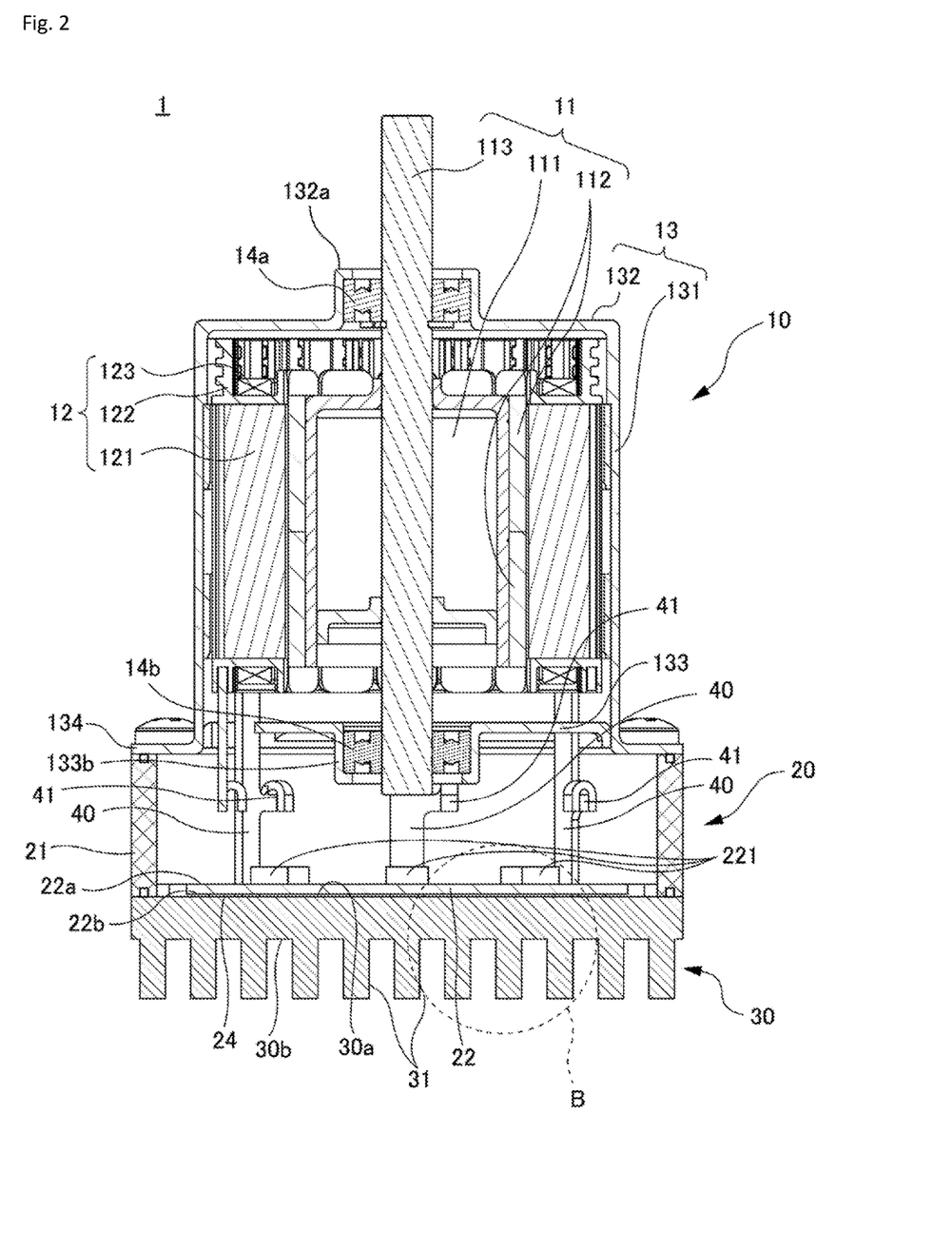
FIG. 2 is a cross-sectional view along Line A-A in FIG. 1.

FIG. 1 is a perspective view of a motor 1 according to one embodiment of the present disclosure, and FIG. 2 is a cross-sectional view along the line A-A of FIG. 1.

As illustrated in FIG. 1, the motor 1 comprises a motor main body 10, a drive circuit part 20 and a heat sink 30.

(Motor Main Body)

As illustrated in FIG. 2, the motor main body 10 comprises a rotor 11 arranged in the center, a stator 12 arranged on the outer periphery of the rotor 11, and a frame 13 arranged to cover the outer periphery of the stator 12.

The rotor 11 comprises a rotor yoke 111, a rotor magnet 112 provided on the outer periphery of the rotor yoke 111, and a shaft 113 provided coupled with the rotor yoke 111 and penetrating the center of the rotor yoke 111.

The stator 12 comprises a stator core 121, an insulator 122 covering the stator core 121, and a coil 123 wound around the insulator 122.

The frame 13 comprises a cylindrical side wall part 131 covering the outer periphery of the stator 12 and a bottom part 132 formed integrally with one end portion on an upper side (one side) of the side wall part 131.

On the middle side of the bottom part 132, a recess portion 132a is formed to accommodate a bearing part 14a for rotatably bearing the shaft 113 projecting to the upper side (one side), and in the center of the recess portion 132a, a through hole is provided in order to lead one end side of the shaft 113 outside.

By fixing the stator 12 to the side wall part 131 of the frame 13 by means of pressing or bonding, the frame 13 and the stator 12 are integrated.

At an end portion on a lower side (other side) of the side wall part 131 of the frame 13, a cover part 133 is arranged.

On the middle side of the cover portion 133, a recess portion 133b is formed in order to accommodate a bearing part 14b for rotatably bearing the shaft 113 projecting to the lower side (other side), and in the center of the recess portion 133b, a through hole is provided in order to lead the other end side of the shaft 113 through.

Accordingly, the rotor 11 is rotatably supported at the upper (one) side and the lower (other) side of the shaft 113 by the bearing part 14a and the bearing part 14b and is thereby rotatably provided with respect to the stator 12.

The motor 1 further comprises a winding terminal 40 attached to the stator 12. Although the details thereof are mentioned later, as illustrated in FIG. 2, the winding terminal 40 comprises a coil connection portion 41 at the upper (one) side of the winding terminal 40. To the coil connection portion 41 an end portion of the coil 123 (coil 123 wound around the insulator 122) of the motor main body 10 is electrically connected. Further a portion of the lower (other) side of the winding terminal 40 is electrically connected to a power element 221 through a conductive pattern on a circuit board 22 explained later.

The current controlled by the power element 221 is thus supplied to the coil 123 through the winding terminal 40, and the motor 1 is thereby driven.

In order to lead the winding terminal 40 out to the side of the drive circuit part 20, a through hole is provided to the cover portion 133 to lead the winding terminal 40 through.

Since the motor 1 according to the present embodiment is a three-phase brushless motor, as illustrated in FIG. 2, the motor 1 includes three winding terminals 40. However, the number of phases is not limited and can therefore be increased or decreased depending on the required number of phases.

Furthermore, the type of the motor is not limited to a brushless motor. Although, according to the present embodiment, the inner rotor type in which the rotor 11 lies in the center is illustrated, the motor can be the outer rotor type motor in which the stator lies in the center and the rotor is arranged outside the stator.

(Drive Circuit Part)

The drive circuit part 20 comprises an outer wall part 21 screwed to a flange 134 formed at the end on the lower (other) side of the frame 13 and the circuit board 22 arranged inside the outer wall part 21.

The circuit board 22 may have a general structure which can be produced at low cost, e.g. such that a conductive pattern that serves as an electric wiring is formed on the front and rear surfaces of the base material formed with resin such as epoxy or glass epoxy, and that required positions of the conductive patterns on the front and rear surfaces are connected by via holes.

The above general circuit board is produced by forming a conductive film (e.g. film made of copper or the like) as a solid pattern on both of the entire surfaces of the base material and etching the conductive films such that a conductive pattern is drawn.

The etching is carried out only at the positions where the etching is needed for making the conductive pattern. Even at the portions of the conductive films which are not used for the conductive pattern, the solid pattern remains at the portions where no etching is needed.

Generally, since the material for forming the conductive film (e.g. copper and the like) has a large heat conductivity, heat conduction in the cross direction of both of the surfaces of the circuit board is not bad.

On the other hand, for the general base material, a material having low heat conductivity and high thermal resistance such as phenol or glass epoxy is used. Heat conductivity from the front surface side to the rear surface side of the circuit board is thus not good.

Accordingly, with the general configuration of the circuit board as mentioned above, the cost for the members can be kept lower, and heat radiation in the direction of thickness of the circuit board is low in terms of heat radiation.

As illustrated in FIG. 2, the power element 221 is mounted on an upper face (one face 22a) of the circuit board 22.

Figure 3:
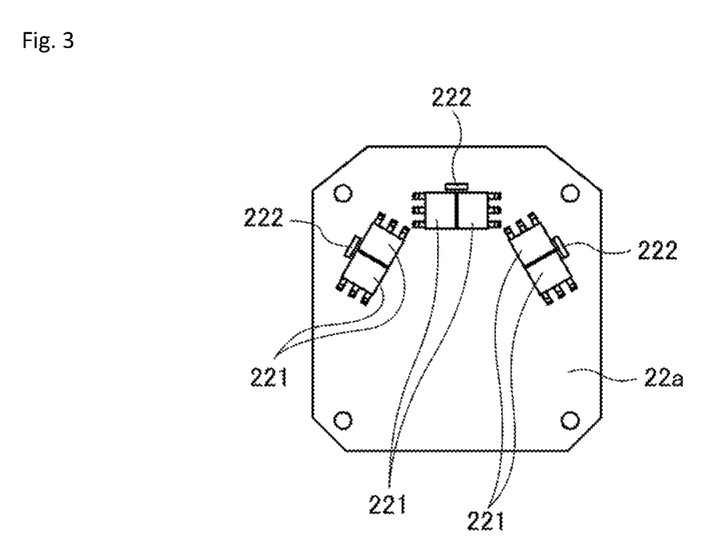
FIG. 3 is a front view showing one face of a circuit board according to the embodiment of the present disclosure.

FIG. 3 is a front view showing the one face 22a (upper face in FIG. 2) of the circuit board 22.

In FIG. 3, the illustration of elements other than the conductive pattern that serves as an electric wiring formed on the one face 22a of the circuit board 22 and the power element 221 is omitted.

As illustrated in FIG. 3, at the circuit board 22, through holes 222 which extend from the one face 22a to the opposite other face 22b (see FIG. 2) are formed at the positions corresponding to the aforementioned three winding terminals 40.

Moreover, on the one face 22a of the circuit board 22, a pair of two power elements 221 is attached near each of the through holes 222 in a manner such that the power elements 221 are electrically connected to predetermined conductive patterns which are not shown.

The conductive patterns are also applied to the wall surface of the through holes 222, and the through holes 222 are formed as through holes with a large diameter.

Figure 4:
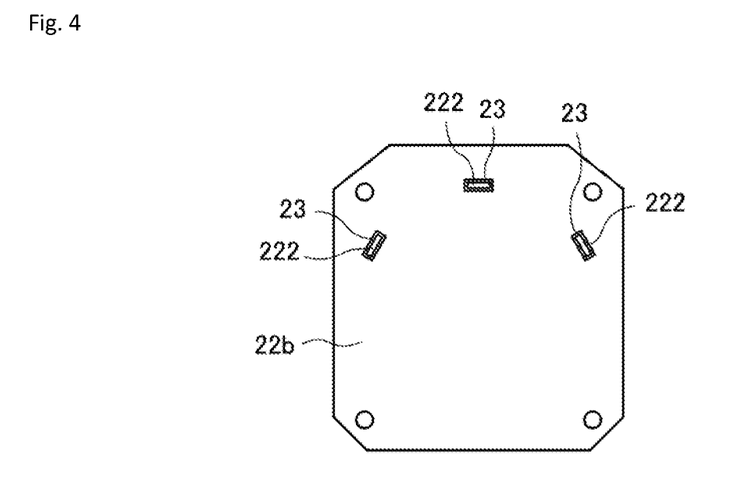
FIG. 4 is a reverse view showing the other face of the circuit board according to the embodiment of present disclosure.

FIG. 4 is a front reverse view of the circuit board 22 viewed from the other face 22b (lower face in FIG. 2).

Also, in FIG. 4, the illustration of the conductive patterns serving as an electric wiring and other elements other than the lands 23 formed on the other face 22a of the circuit board 22 are omitted.

As illustrated in FIG. 4, the lands 23 to be electrically connected to the winding terminal 40 are formed on the periphery of the through holes 222 through which the winding terminals 40 pass, respectively. The other side of the winding terminals 40 arranged to project from the other face 22b of the circuit board 22 through the through holes 222 are soldered to the lands 23, respectively.

According to the present embodiment, the lands 23 and the winding terminals 40 are soldered, however, there is no limitation to the soldering and it is possible to bond the members by a conductive adhesive or the like.

Although illustration is omitted, the lands 23 are electrically connected to the power elements 221 located on the one face 22a of the circuit board 22, respectively, with the conductive patterns on the wall surfaces of the through holes 222 formed as the through holes with a large diameter, the other sides of the winding terminals 40 are soldered to the lands 23, respectively.

At the time of this soldering, the gap between the through hole 222 and the winding terminal 40 is filled with the solder, thus, a part of the other side of the winding terminal 40 is electrically connected to the power element 221 with a low electric resistance.

The soldering operation is easily performed by a configuration of providing the lands 23 in the manner in which the other side of the winding terminal 40 is soldered to the lands 23 on the side of the other face 22b of the circuit board 22, because in order to achieve the mounting situation in FIG. 2, it suffices to screw the outer wall portion 21 of the drive circuit part 20 to the flange 134 of the frame 13 of the motor main body 10, and then set the circuit board 22 so as to lead the other side of the winding terminal 40 through the through hole 222 of the circuit board 22, and solder the base portion of the winding terminal 40 projecting from the other face 22b of the circuit board 22 to the lands 23.

Figure 5:
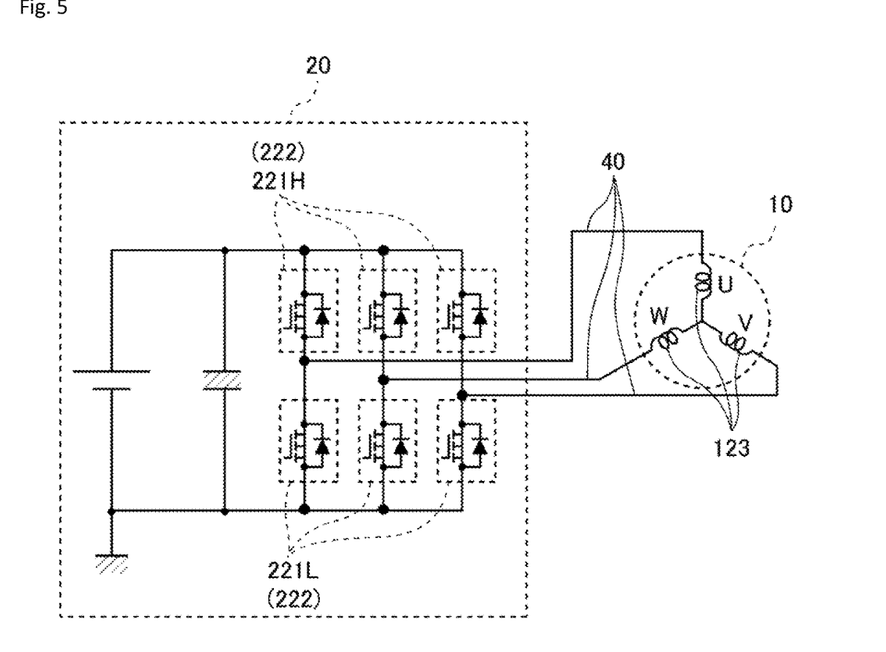
FIG. 5 is a drive circuit diagram of the motor according to the embodiment of the present disclosure.

The reason for providing one winding terminal 40 with two power elements 221 as mentioned above is hereinafter briefly explained while making reference to the drive circuit diagram in FIG. 5.

More specifically, one of the above-mentioned two power elements 221 is a high-side power element 221H and the other is a low-side power element 221L.

Namely, the configuration to provide the above-mentioned two power elements 221 shows the configuration to provide the high-side power element 221H and the low-side power element 221L in pairs. The high-side power element 221H and the low-side power element 221L are controlled by a control circuit (not shown) and the current to be supplied to the motor main body 10 is thereby controlled.

Using the high-side power element 221H and the low-side power element 221L is preferable, as the positive and the negative current can be controlled and the efficiency in use of the electric power can be improved.

However, although the efficiency in use of the electric power would decrease, it is possible to provide solely the high-side power element 221H to configure a driving circuit so as to drive the motor 1, hence it is not necessarily limited to provide one winding terminal 40 with two power elements 221 (high-side power element 221H and low-side power element 221L) as a set.

(Heat Sink)

As illustrated in FIG. 2, one face 30a of the heat sink 30 facing the circuit board 22 is essentially flat and the other face 30b opposite to the one face 30a is configured with a plurality of projections 31 so as to increase the heat radiation area to enhance the efficiency of heat radiation.

The heat sink 30 is screwed at the screw portion provided at the four corners of the outer wall portion 21 of the drive circuit part 20 opposite to the motor main body 10 (see FIG. 1).

Prior to fastening the heat sink 30 with screws, as illustrated in FIG. 2, an electrical isolating and heat conductive sheet (an example of an electrical isolating and heat conductive material) 24 is provided at the one face 30a of the heat sink 30 facing the circuit board 22.

By the above means, it becomes difficult to form a gap between the heat sink 30 and the circuit board 22, where there is air with low heat conduction. Thus, heat conduction from the circuit board 22 to the heat sink 30 can be enhanced.

However, it is not necessary to limit to the heat conductive sheet, but it is possible to provide an electrical isolating and heat conductive adhesive or the like between the circuit board 22 and the heat sink 30. Also by the above means, the gap between the heat sink 30 and the circuit board 22 where there is air, becomes difficult to be formed, hence the heat conduction from the circuit board 22 to the heat sink 30 can be enhanced.

Figure 6:
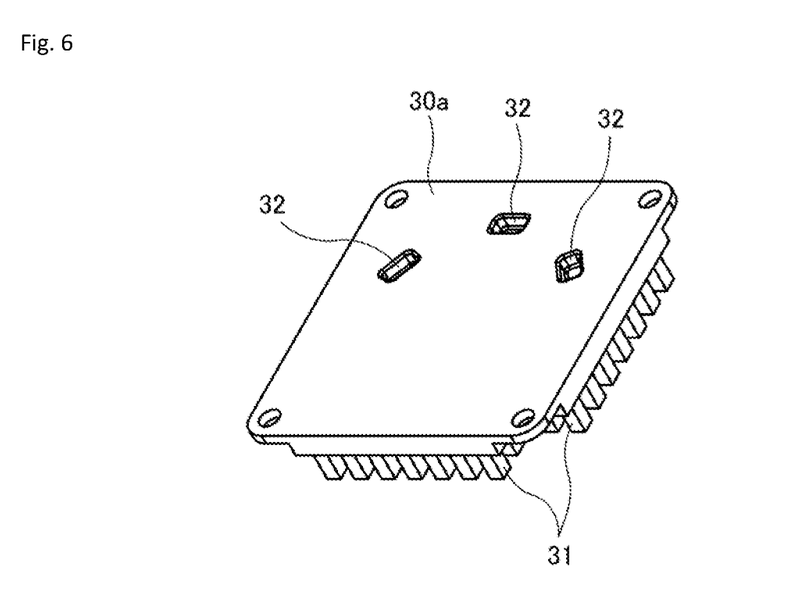
FIG. 6 is a perspective view of a heat sink according to the embodiment of the present disclosure.

FIG. 6 is a perspective view of mainly the one face 30a of the heat sink 30, the one face 30a faces the circuit board 22.

As illustrated in FIG. 6, groove parts 32 are formed at the one face 30a in order to accommodate the end on the other side of the winding terminal 40 projecting from the other face 22b of the circuit board 22.

The groove part 32 are formed in such size that the winding terminals 40 do not directly contact the heat sink 30.

Figure 7:
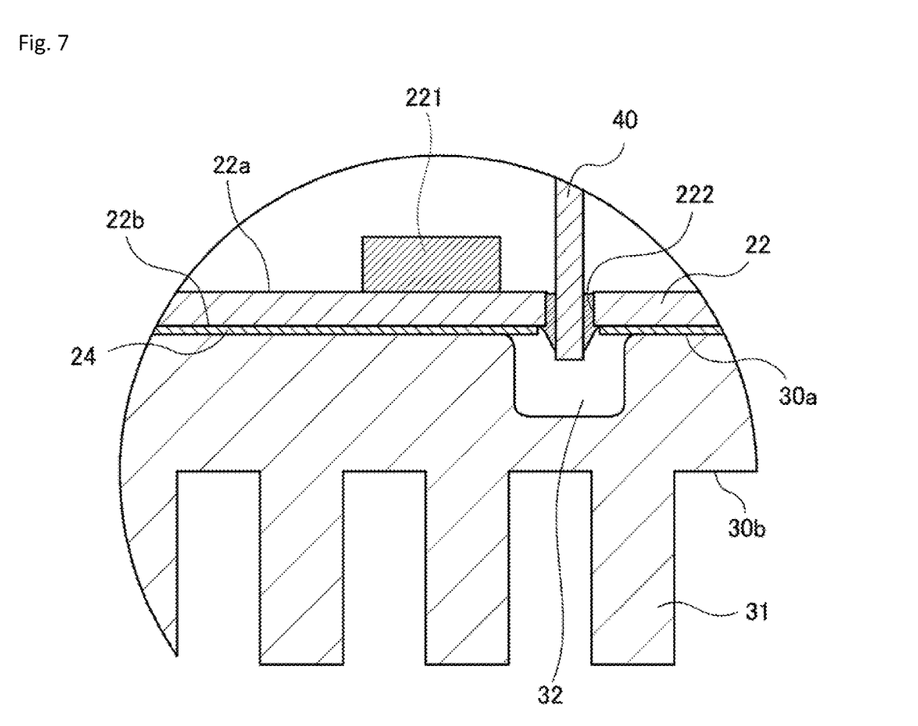
FIG. 7 is an enlarged view of Portion B circled with a dashed line in FIG. 2.

Therefore, as illustrated in FIG. 7 as an enlarged drawing of the portion B in FIG. 2 circled with a dashed line, since the end on the other side of the winding terminal 40 is, when the motor 1 is in the situation of FIG. 2, arranged in the groove part 32 provided to the heat sink 30 so as not directly contact the heat sink 30, the winding terminal 40 and the heat sink 30 are spatially distanced so as to achieve an electrically isolated condition.

The detail of the configuration of the motor 1 for heat radiation having said configuration is explained hereinafter.

It is possible that the other side of the winding terminal 40 is electrically connected to the power element 221, thus, if explaining on the basis of FIG. 7, it may originally also be possible to bond the other side of the winding terminal 40 by means of soldering or an electrically conducting adhesive to the one face 22a of the circuit board 22 so as to be electrically connected to the power element 221.

As stated above, however, according to the present embodiment, through holes 222 are provided to the circuit board 22, and, as illustrated in FIG. 7, and arranged such that the other side of the winding terminal 40 penetrates the circuit board 22 from the one face 22a through the through holes 222 to the other face 22b. The projecting base portion of the winding terminal 40 is soldered to the lands 23 (not shown) on the other face 22b side.

An electrical conducting material such as copper is used for the member for the purpose of current flow such as the winding terminal 40, and such material has a relative large heat conductivity and thereby a small heat resistance. Accordingly, it is possible to conduct heat much more effectively in comparison to the member solely provided with through holes.

The heat generated by the power element 221 is thus effectively conducted from the one face 22a via the winding terminal 40 to the other face 22b of the circuit board 22 and via the other face 22b to the heat sink 30 so as to effectively radiate the heat.

Moreover, this configuration is so simple that it is necessary merely to provide the through hole 222 at the position which corresponds to the winding terminal 40 of the circuit board 22, thus, there is hardly any increase in the production cost of the circuit board 22.

On the other hand, the heat resistance may vary depending on the cross-sectional area of the winding terminal 40. For example, when considering the case where the material of the winding terminal 40 is copper, if it is sufficient only to supply the necessary current to the coil 123 of the motor main body 10 from the power element 221, the winding terminal 40 with a cross-sectional area of ca. 1 mm$^2$ can be used for a current of ca. 5 A. In this case, the heat resistance is ca. 3.970 [° C./W] if the plate thickness of the circuit board 22 is 1.6 mm (moreover, the heat conductivity of copper is 403 W/mK).

However, according to the present embodiment, copper which has relatively large heat conductivity is used for the winding terminal 40 and the winding terminal 40 has a cross-sectional area of 4 mm$^2$ in a rectangular form with a length of 1 mm and a width of 4 mm.

As mentioned above, it is further possible to decrease the heat resistance by means of a cross-sectional area larger than a cross-sectional area necessary for the current flow. More specifically, the heat resistance of the winding terminal 40 according to the present embodiment is lowered up to ca. 0.993[° C./W].

Accordingly, it is possible to conduct heat according to the present embodiment more effectively in comparison to a winding terminal whose sole purpose is for current flow.

Additionally, according to the present embodiment, the winding terminal 40 has an essentially equal cross-sectional area in the direction of length thereof. On the other hand, since the portion of the winding terminal 40 which contributes to the heat conduction from the one face 22a to the other face 22b of the circuit board 22 is mainly a portion located in the through hole 222, it is not necessary to enlarge the cross-sectional area in the direction of the entire length thereof for reduction of the heat resistance. It may be possible that the cross-sectional area at least of the portion to be located in the through hole 222 is enlarged.

On the other hand, the winding terminal 40 can effectively conduct heat if the material thereof has a high heat conductivity and low heat resistance. Therefore, a case where copper is used as an example is shown in the present embodiment. However, even if other material is used, an electrically conducting material which can increase the heat conductivity and decrease the heat resistance can preferably be used.

In comparison to the case where no winding terminal 40 is provided which penetrates the circuit board 22, even a winding terminal designed for current supply can form a new heat conductive path to conduct heat from the one face 22a to the other face 22b of the circuit board 22, the conductive path having a heat resistance of ca. 3.970 [° C./W], if the through hole 222 is provided to the circuit board 22 and the winding terminal 40 penetrates the circuit board 22 via the through hole 222. The quality of heat radiation can thereby be improved, however, it is preferred that heat can be radiated more effectively.

It is preferred that the winding terminal 40 is set such that at least the portion located in the through hole 222 has a heat resistance of 3.5 [° C./W] or less, moreover, it is preferred that the winding terminal 40 is set such that at least the portion located in the through hole 222 has a heat resistance of 3.0 [° C./W] or less.

If the cross-sectional area of the winding terminal 40 increases, the heat resistance itself can be lowered, however, the winding terminal 40, and accordingly the through hole 222, must be enlarged.

For example, with the winding terminal 40 having a rectangular cross-sectional area with a length of 2 mm and a width of 8 mm, the heat resistance can be lowered to 0.248 [° C./W], however, the circuit board 22 must be enlarged. In the aspect of a compact configuration, this means is thus not preferred.

In consideration of the above, it is preferred that the winding terminal 40 is set such that at least the portion located in the through hole 222 has a heat resistance of 0.300 [° C./W] or more. Moreover, it is preferred that the winding terminal 40 is set such that at least the portion located in the through hole 222 has a heat resistance of 0.330 [° C./W] or more.

Such heat resistance (0.330 [° C./W] or more) can be realized without an enlargement of the cross-sectional area of the winding terminal 40 that may cause a larger configuration of the circuit board 22.

As mentioned above, the present disclosure is explained based on the embodiment. However, the present disclosure is not limited to the embodiment and can vary within a range not exceeding the main gist.

According to the embodiment for example, a case was shown where the end on the other side of the winding terminal 40 projects from the other face 22b of the circuit board 22.

However, it is not always necessary that the above end is projecting. The end on the other side of the winding terminal 40 may be arranged such that the end is substantially flush with the other face 22b of the circuit board 22.

For the above purpose, a groove part 32 is provided to accommodate the end on the other side of the winding terminal 40 in the present embodiment. However, the groove part 32 is also not necessarily an indispensable component.

Moreover, the groove part 32 of the heat sink 30 is configured as an empty space in the present embodiment. However, for example, the groove part 32 can be filled with an electrical isolating and heat conductive material (e.g. an electrical isolating and heat conductive adhesive, an electrical isolating and heat conductive sheet or grease and the like) so as to embed the space of the groove part 32.

The above means is advantageous since the heat can be effectively conducted to the heat sink 30 even from the end on the other side of the winding terminal 40, the end being arranged in the groove part 32 and distanced for avoiding a direct contact.

Furthermore, the case where no electronic components are provided at the other face 22b of the circuit board 22 was shown in the present embodiment. However, it is also possible to provide components such as a resistor and a capacitor to the other face 22b of the circuit board 22.

In such a case, the other face 22b of the circuit board 22 and the heat sink 30 are distanced from each other with assistance from any intermediate component. Therefore, for example, a groove portion may be provided at the position of the heat sink 30 corresponding to the component so as to achieve a close contact of the other face 22b of the circuit board 22 with the heat sink 30, or an electrical isolating and heat conductive adhesive and the like may be applied to the distanced portion with a thickness larger than the thickness of the component so as to effectively conduct the heat from the other face 22*b* of the circuit board 22 to the heat sink 30.

As mentioned above, the present disclosure is not limited to a specific embodiment and thus includes variations as well as modifications. In consideration of the claims, the above is evident for those skilled in the art.

What is claimed is:

1. A motor comprising:
   a motor main body including a rotor and a stator around which a coil is wound,
   a drive circuit part including a circuit board to which a drive circuit including a power element is attached on mainly one face,
   a heat sink arranged on another face of the circuit board and to radiate heat of the drive circuit part, and
   a winding terminal to which at one side of said winding terminal an end portion of the coil of the motor main body is electrically connected, another side of said winding terminal being partially electrically connected to the power element attached to the circuit board, and said winding terminal to conduct heat generated by the power element from the one face to the other face of the circuit board.

2. The motor according to claim 1, wherein
   an electrical isolating and heat conductive material is provided on one face of the heat sink to be on the circuit board side.

3. The motor according to claim 1, wherein
   the other side of the winding terminal is soldered to a land of the circuit board electrically connected to the power element.

4. The motor according to claim 3, wherein
   the land is provided at the other face of the circuit board and
   the land is electrically connected to the power element with an electrical conductive pattern connected from the land to the one face of the circuit board.

5. The motor according to claim 1, wherein
   an end portion on the other side of the winding terminal is arranged to project from the other face of the circuit board and arranged in a groove part formed at the heat sink so as not to directly contact the heat sink.

6. The motor according to claim 5, wherein
   an electrical isolating and heat conductive material is provided in the groove part of the heat sink to conduct heat from the end portion at the other side of the winding terminal to the heat sink.

7. The motor according to claim 1, wherein
   a material with low heat resistance is used for the winding terminal, and a portion of the winding terminal for heat conduction from the one face to the other face of the circuit board has a cross-sectional area that is sufficiently larger than a cross-sectional area required for a current flow.

* * * * *